United States Patent
Tebbe

[19]

[11] Patent Number: 6,119,677
[45] Date of Patent: Sep. 19, 2000

[54] APPARATUS FOR CLAMPING AND PRECISELY CUTTING METAL CASTINGS

[76] Inventor: Joseph J. Tebbe, 3682 White Bear Ave., White Bear Lake, Minn. 55110

[21] Appl. No.: 09/184,150

[22] Filed: Nov. 2, 1998

[51] Int. Cl.[7] ...................................................... B28D 7/04
[52] U.S. Cl. ............................ 125/35; 451/364; 451/365
[58] Field of Search .............................. 451/8, 9, 14, 24, 451/51, 64, 69, 243, 251, 242, 340, 364, 365, 406, 407; 125/13.01, 16.03, 35; 269/71

[56] References Cited

U.S. PATENT DOCUMENTS

| | | | |
|---|---|---|---|
| 3,807,095 | 4/1974 | Harding, Deceased et al. | 125/35 |
| 3,844,269 | 10/1974 | Rater | 125/35 |
| 3,878,654 | 4/1975 | Wendt, III et al. | 451/129 |
| 4,123,876 | 11/1978 | Simmons et al. | 451/129 |

*Primary Examiner*—Derris H. Banks
*Attorney, Agent, or Firm*—Herman H Bains

[57] ABSTRACT

An apparatus for holding and cutting an metal tree casting includes a frame having a vertically shiftable cutting blade assembly mounted thereon. A horizontally disposed clamp is mounted on a pivot support for pivoting the clamp horizontally about a vertical axis. The clamp is provided with clamping jaws for clamping the metal casting tree and is rotatable about a horizontal axis. A carriage is mounted on a transverse slide assembly and pivotally supports the pivot support thereon. A longitudinal slide assembly is connected with the transverse slide assembly and cooperates therewith for permitting transverse and longitudinal movement of the clamp and metal tree clamped thereby.

11 Claims, 4 Drawing Sheets

APPARATUS FOR CLAMPING AND PRECISELY CUTTING METAL CASTINGS

FIELD OF THE INVENTION

This invention relates to an apparatus for holding and cutting investment casting clusters or trees as produced by metal casting foundries such as investment casting, sandcasting, die casting and the like.

BACKGROUND OF THE INVENTION

In the production of castings, several similar or identical articles are simultaneously cast as a cluster or tree. This style of casting is usually referred to as metal casting. The metal casting tree must first be cleaned and thereafter the various cast articles are cut from the tree. The metal tree is usually cleaned in a water blasting process.

In prior art systems, after the casting tree is cleaned, it is usually held by a traditional clamping device during cutting of the cast articles from the tree. The conventional clamp devices require manual tightening of the jaws and the cutting operation places the operator closely adjacent the cutting tool. Injuries to workers are commonplace in the prior art setting. Precision cutting is difficult to achieve with these prior art systems.

SUMMARY OF THE INVENTION

An object of this invention is to provide a novel apparatus for the precise manipulation and precision cutting of cast articles from a metal casting tree.

A more specific object of this invention is to provide a novel apparatus for clamping, manipulating and safely cutting cast articles from a metal casting tree while permitting the operator to remain a safe distance from the cutting tool.

The apparatus includes a shiftable clamping assembly for holding the metal casting tree to be cut and which is variously adjustable relative to a vertically shiftable cutting tool permitting precise positioning of the metal casting tree while the operator remains at least four feet from the cutting tool. The clamping assembly for holding the metal casting tree is shiftable along two linear axis and is also rotatable and horizontally pivotal relative to the cutting tool. These complex movements of the clamping assembly allow the investment casting tree to be accurately positioned and precisely cut without subjecting the operator to the usual dangers involved with foundry cutting operations.

DESCRIPTION OF THE PREFERRED EMBODIMENT

Figure 1:
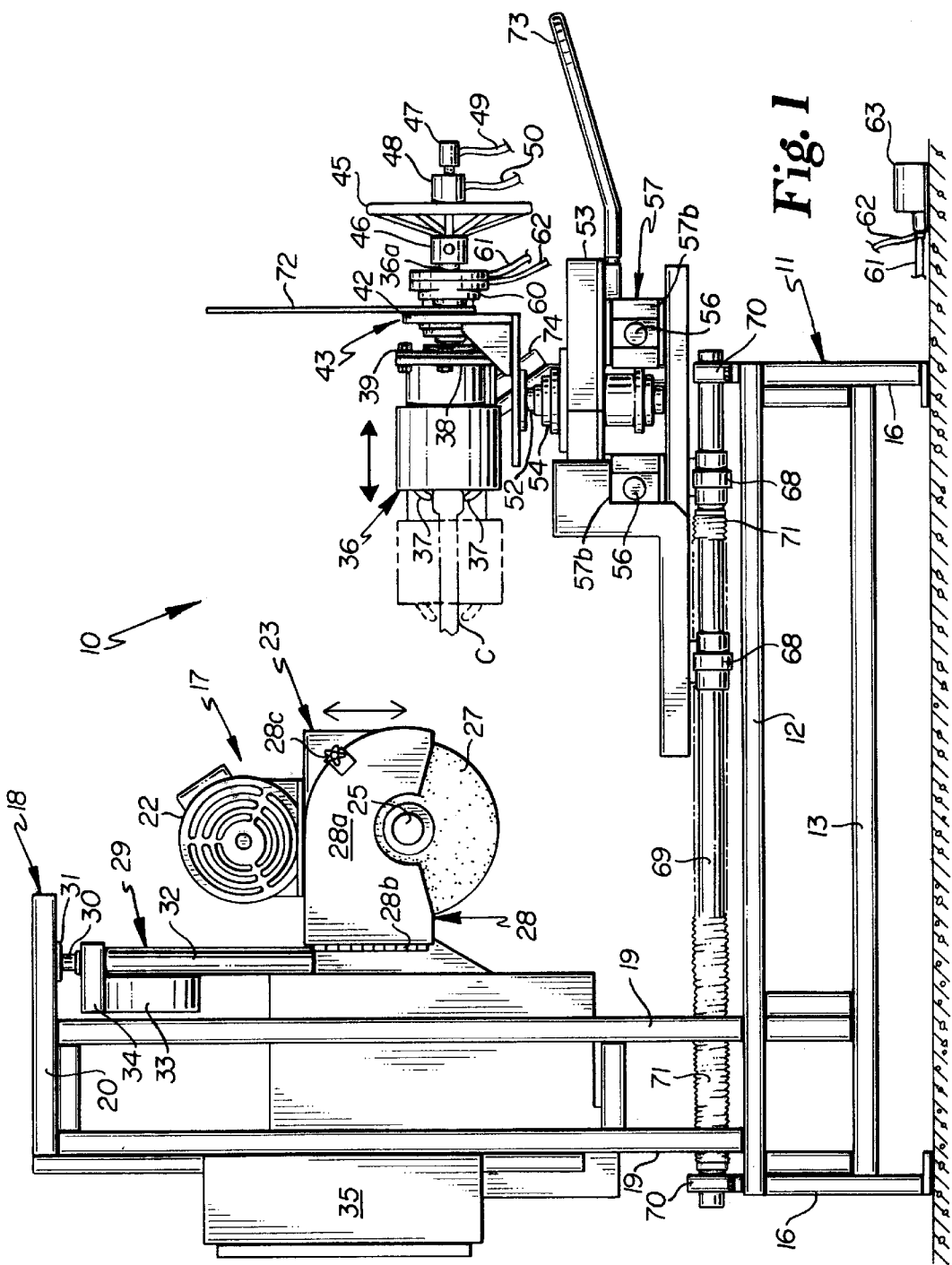
FIG. 1 is a side elevational view of the novel apparatus with certain parts thereof illustrated in an adjusted position by phantom line configuration.

Referring now to the drawings, it will be seen that one embodiment of the novel apparatus for clamping and cutting metal cast trees is there shown and is designated by the general reference numeral 10. The apparatus 10 includes a main frame 11 comprised of upper elongate longitudinal frame members 12 and lower elongate longitudinal frame members 13. The frame 11 also includes upper transverse frame members 14 and lower transverse frame member 16. Vertical legs 11 connect the longitudinal and transverse frame members to present a generally rectangular shaped main frame. Vertical frame members interconnect the upper and lower longitudinal frame members and the upper and lower transverse frame members. The legs 16 support the apparatus on the floor at a comfortable height for an operator to manipulate the various components thereof.

The apparatus also includes a cutter assembly 17 which is shiftably mounted for vertical movement on a cutter assembly support frame 18. The cutter assembly support frame 18 includes vertical frame members 19 which are rigidly secured at their lower ends to the upper longitudinal frame members 12. Longitudinal frame elements 20 interconnect the upper ends of the vertical frame members 19. Elongate transverse frame elements 21 also interconnect the vertical frame members 19. The cutter assembly support frame provides a sturdy support adjacent one end of the main frame for the cutter assembly 17.

Figure 2:
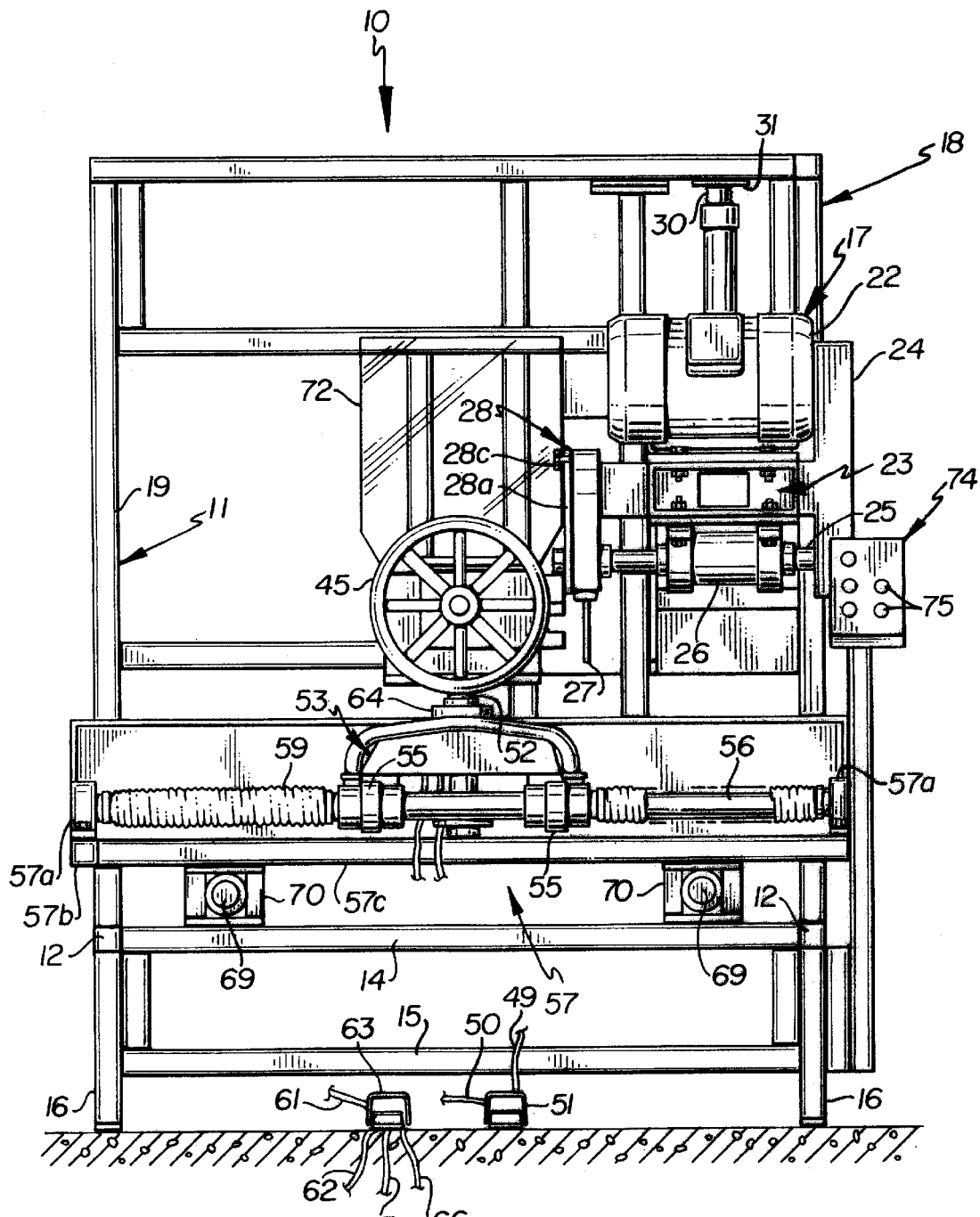
FIG. 2 is an end elevational view of the apparatus.
Figure 3:
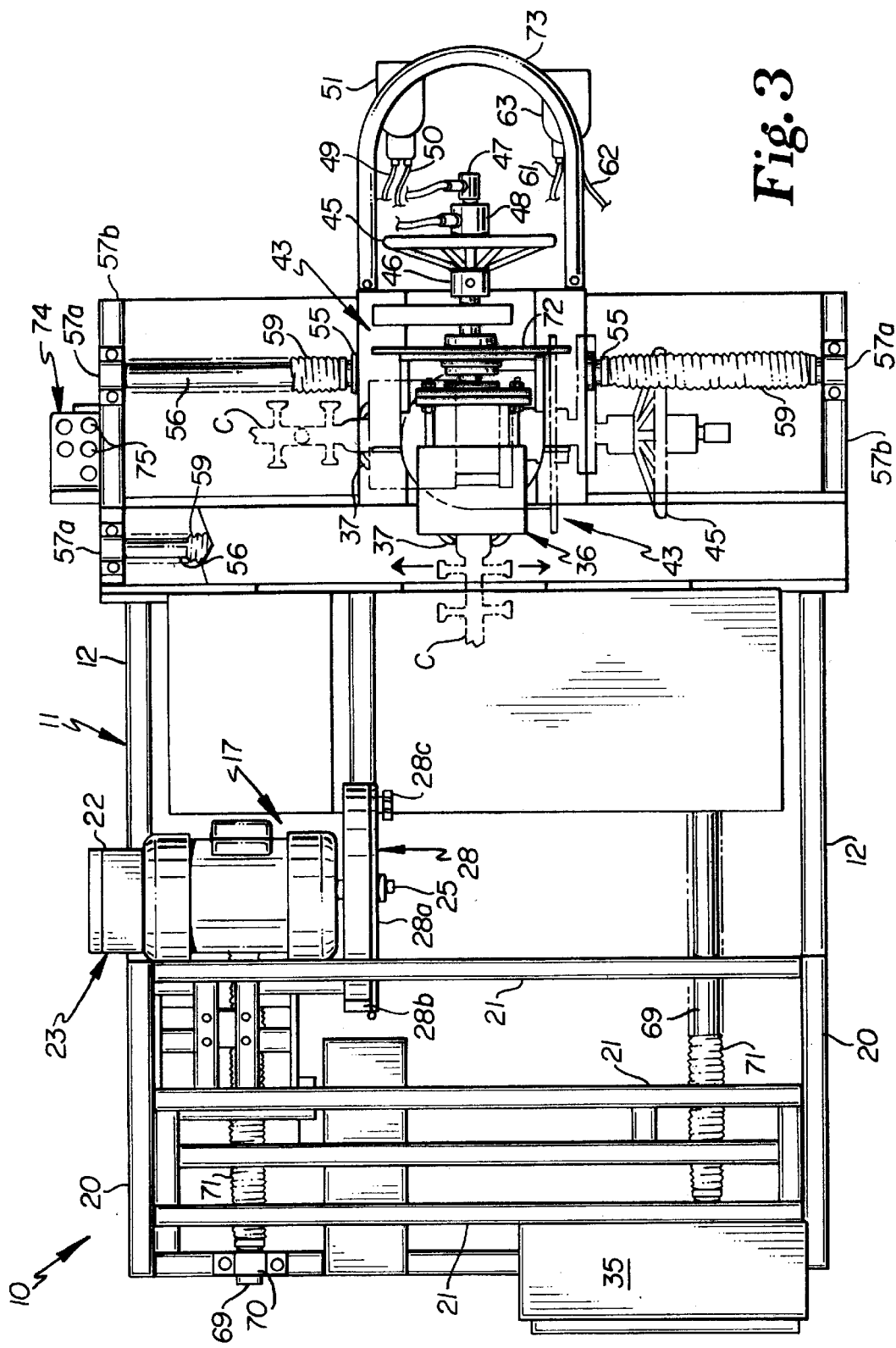
FIG. 3 is a plan view of the apparatus.
Figure 4:
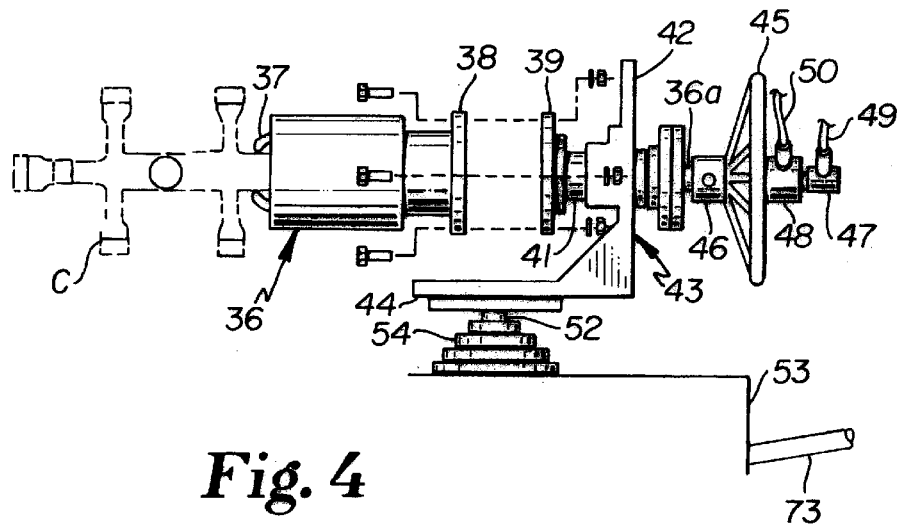
FIG. 4 is a side elevational view of certain components of the apparatus.

The cutter or saw assembly 17 includes an electric motor 22 which is mounted on a support structure 23 for the cutter assembly. The support structure also supports the various components of the cutter assembly. The output shaft of the electric motor is connected to a transmission device 24 which increases the output speed or angular velocity of the output shaft of the electric motor 22. The output shaft 25 of the transmission device 24 is journaled in a suitable heavy duty bearing 26 as best seen in FIG. 2. A rotary saw blade or cutter 27 is fastened to the output shaft 25 and is driven when the electric motor 22 is energized. A guard 28 is secured to the support 23 and provides a safety covering for the saw 27.

The guard 28 includes a door 28a which is hingedly secured to the guard by a hinge 28b. A lock suitably locks the door 28a to the guard. The door 28a provides easy access to the saw blade to permit ready removal and replacement thereof.

Means are provided for vertically shifting the saw or cutter assembly 17 relative to the cutter assembly support frame 18. This means includes a jack screw drive 29 including a jack screw 30. The jack screw is journaled in suitable bearings 31, only one of which is shown in the drawings. The support structure 23 for the cutter assembly is rigidly secured to a tubular housing 32 which is located exteriorly of the jack screw and drivingly connected to the jack screw 30.

The jack screw 30 is drivingly rotated by a drive motor 33 which is secured to the tubular housing 32. Suitable drive connections 34 drivingly connect the output shaft of the electric motor 33 with the jack screw 30. Although not shown in the drawings, the jack screw will be rotated and a nut fixedly connected to the interior of the tubular housing 32 will move the tubular housing vertically in response to the rotation of the jack screw. The drive motor 33 is reversible and permits the saw or cutter assembly to be shifted vertically upwardly or downwardly as required by the cutting operation. The various electrical components 35 for the saw or cutter assembly are located in a housing 35 mounted on the frame 18.

Means are provided for holding the metal cast tree during the cutting operation and this means includes a clamp 36. The clamp 36 is preferably the clamp disclosed in my U.S.

Pat. No. 5,044,421 and the content of that patent is incorporated herein by reference. The clamp 36 includes clamp jaws 37 which clamp the conical sprue of the metal casting tree. The clamp 36 is provided with a flange 38 provided with suitable apertures for accommodating bolts 40. The flange 38 is bolted against a flange 39 secured to a suitable bearing 41. The bearing 41 is mounted in an opening in a vertical plate 42 of an L-shaped mounting structure 43. The L-shaped mounting structure also includes a horizontal plate 44.

The clamp 36 is connected to one end of an elongate shaft 36a which extends through the flanges 38, 39 and bearing 41 and is keyed to a steering wheel 45. The shaft 36a is hollow and hydraulic fluid is supplied through the shaft 36a for opening and closing the jaws of the clamp 36. The steering wheel 45 is provided with a hub 46 which is secured to the shaft 36a. Rotation of the steering wheel 45 causes rotation of the clamp 36 about its longitudinal axis. Rotation of clamp 36 about its longitudinal axis allows angular adjustment of the metal tree carried by the clamp jaws. A pair of double hydraulic fittings or unions 47, 48 are provided for supplying hydraulic fluid to clamp 36 for clamping and releasing the clamp. The fittings 47 and 48 are connected by conduits 49 and 50 to a source of hydraulic fluid under pressure comprising a hydraulic power pack P. Interposed between the source of hydraulic power pack P and the fittings 47, 48, is a foot pedal 51 which is pressed to open the jaws 37 of the clamp 36. The jaws of the clamp 36 are normally closed and the pedal is released to close the jaws of the clamp. The fluid pressure to and from the jaws is supplied via the foot pedal 51 through the conduits 49 and 50 which operates a solenoid valve (not shown) to open the clamp jaws when the pedal is depressed.

The L-shaped mounting structure 43 which carries the clamp 36 is pivotally connected to a generally rectangular-shaped carriage 53. In the embodiment shown, the horizontal plate 44 of the L-shaped mounting structure 43 is pivotally connected to the carriage 53 by a pivot 52. The pivot 52 extends through suitable bearings 54 mounted on the carriage 53 and permits horizontal pivotal movement of the L-shaped mounting structure 43 in either direction about a vertical axis. It will therefore be seen that the clamp 36 is not only angularly adjustable (rotatable) about a horizontal axis but is also angularly adjustable about a vertical axis. This particular arrangement allows for a wide range of adjustments of the clamped metal tree during the cutting operation.

The carriage 53 has its lower surface secured to a plurality of symmetrically arranged slide blocks 55 each having a bore for engagement with a pair of transverse slide rods 56. In the embodiment shown, the carriage 53 is provided with four slide blocks 55, a pair of which engages each transverse slide rod 56 to permit transverse or lateral sliding movement of the carriage 53 and the L-shaped mounting structure 43. The ends of the transverse rods 56 are secured by clamps 57a to longitudinal frame elements 57b of a slide frame 57. The longitudinal frame elements 57a are secured to transverse frame element 57c of slide frame 57. It will be seen that the transverse slide rods 56 are provided with collapsible and extensible bellows or covers 59, each cover extending between a slide block 55 and the adjacent clamp 57a. These bellows prevent debris from accumulating on the transverse slide rods and assure smooth transverse movement of the carriage during operation of the apparatus.

Means are provided for locking the L-shaped mounting structure 43 in an adjusted pivoted position and for locking the clamp 36 in an adjusted angular position. This means includes a clamp locking device 60 which is operative to clamp the shaft 36a in an adjusted angular position. The locking device 60 is connected in communicating relation to conduits 61 and 62 which are connected to the hydraulic power pack P. A second foot pedal 63 is interposed between the hydraulic power pack P and the clamp locking device 60 and is connected in communicating relation to the conduit 61 and 62. By depressing the foot pedal, the locking device 60 clamps the shaft 36a against rotation and thereby locks the clamp 36 in an adjusted angular position.

Means are also provided with locking the L-shaped mounting structure 43 in an adjusted angular position and this locking device 64 is positioned below the horizontal plate 44 of the L-shaped mounting structure. The locking device 64 is connected by conduits 65 and 66 to the hydraulic power pack P and when the locking device 64 is actuated, the pivot 52 is locked against movement relative to the carriage 53 to lock the L-shaped mounting structure and the clamp 36 in an adjusted angular position.

The actuating means for operating the pivot locking means 64 is the foot pedal 63 which is interposed between the pivot locking means 64 and the hydraulic power pack P. Foot pedal 63 is connected in communicating relation with the conduits 65 and 66 and when depressed locks the pivot against movement. It will therefore be seen that actuation of the foot pedal 63 not only locks the L-shaped carriage against movement but also locks the clamp 36 against rotation. The foot pedal 63 therefore simultaneously actuates the locking device 60 and the locking device 64.

The lower surface of the rectangular slide frame 57 has a plurality of slide blocks 68 secured thereto for movement therewith. The slide blocks 68 engage a pair of laterally spaced apart longitudinally extending slide rods 70 which are secured at their respective ends to clamp 70 carried by the upper transverse frame members 14. In the embodiment shown, four slide blocks 68 are arranged in pairs and each pair engages a slide rod 69. It will also be seen that the longitudinal slide rods 69 are provided with bellows or covers 71 for shielding and covering the slide rods against debris generated during the cutting action. These bellows or covers 71 assure smooth shifting of the rectangular slide frame 57 and the various components supported thereby along the slide rod 69.

Referring now to FIGS. 1 and 2, it will be seen that a transparent shield 72 is secured to the vertical plate 42 of the L-shaped mounting structure 43 and projects upwardly therefrom. The transparent shield 72 is of generally rectangular configuration and is positioned to shield the face of an operator against debris generated during the cutting operation. A U-shaped handle 73 has its respective ends secured to the carriage 53 as best seen in FIG. 1. The handle 73 permits an operator to move the carriage 53 in a transverse or lateral direction along the slide rods 56 and in a longitudinal direction along the slide rods 69.

This linear transverse and longitudinal movement is referred to as the XY axis and allows further adjustment of the clamp and investment carriage held thereby relative to the saw 27. When the vertical shifting movement of the saw is considered in the overall adjustment of the metal cast tree during the cutting operation, it will be seen that the apparatus 10 has five axes of adjustment. This arrangement allows an extremely high degree of maneuverability and manipulation of the metal cast tree. Thus, clamp 36 and metal cast tree carried thereby may be shifted laterally, longitudinally, angularly about a vertical axis or angularly about a horizontal axis to precisely position the metal casting tree in the desired position. The vertically shiftable saw allows further adjustment. On the other hand, the operator always stands adjacent but behind the handle 73 and remains at least four feet from the cutting blade during the cutting operation.

Means are provided for controlling operation of the cutter assembly 17 and this means includes a control panel 74 having a plurality of actuator buttons 75 connected in current controlling relation with respect to the saw assembly. The control panel is connected to a source of electrical power. One of the buttons permits upward movement of the saw blade assembly while another button permits vertical downward movement of the saw assembly. One of the actuator buttons energizes the saw and another actuator button de-energizes the saw blade. It will be noted that the control panel 74 is located for easy access by an operator standing adjacent the U-shaped handle 73. It will further be noted that the foot pedals 51 and 63 are located for ready depression by an operator standing adjacent the U-shaped handle 72.

Figure 5:
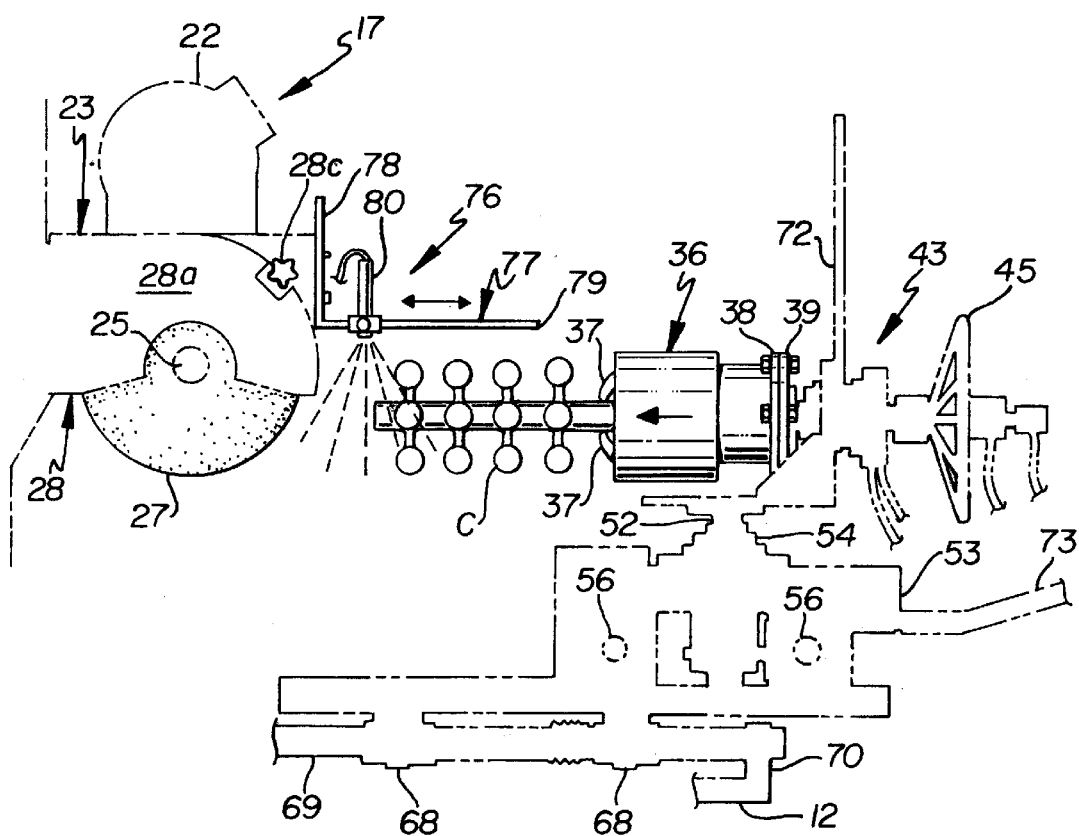
FIG. 5 is a side elevational view of the clamp, metal tree casting and the laser diode guide line device.

Means are also provided as an option for further assisting in the precision cutting of the metal casting tree C. This means includes a laser diode guide line device 76 mounted on the support structure 23 of the cutter assembly 23 as best seen in FIG. 5.

The laser diode guide line device includes an L-shaped bracket 77 attached to the cutter assembly support structure 23. The L-shaped bracket 77 includes a vertical plate 78 and a horizontal plate 79. The vertical plate is adjustably secured to the support structure 23 and a laser diode 80 is adjustably mounted on the horizontal plate. The laser diode is connected by a suitable conductor to a source of electrical power.

The L-shaped bracket may be vertically adjusted relative to the cutter assembly support structure 23, and the laser diode is horizontally adjustable along the horizontal plate 79. The laser diode produces a red line on the metal casting tree C. The red line generated by the laser diode 80 is directed against the casting tree C and precisely defines a cutting line. This precise cutting minimizes the amount of finishing needed on the cast product.

During operation of the apparatus 10, an operator will open the jaws of the normally closed clamp 36 and place the conical sprue of the metal casting tree C in position for gripping by the jaws. By releasing the foot pedal 51, the jaws will actuated hydraulically and clamp the metal casting in preparation for the cutting operation.

The operator will then precisely position the investment casting tree C for cutting by rotating the clamp with the steering wheel 45. The operator may also pivot the L-shaped support 43 relative to the carriage 53 if this adjustment is needed. Further, the operator may laterally move the carriage 53 along the slide runs 56 or may move the carriage and its support frame along slide rod 69. It is pointed out that during these manipulations of the clamp and investment casting tree, the operator will always remain a substantial distance from the saw or blade 27.

The cutter assembly is also vertically adjustable and the operator will adjust the cutter assembly to the desired height. When the metal tree casting C is properly positioned, the saw will be energized and the metal casting tree will be moved into the rotating saw blade to cut the casting. This movement of the metal casting tree is accomplished by pushing the U-shaped handle 73 either longitudinally or laterally towards the saw blade. The laser diode guide line will assist the operator in accurately cutting the casting from the casting tree. It is pointed out that the laser diode device is optional with the apparatus.

From the foregoing description, it will be seen that I have provided a novel apparatus for clamping and precisely cutting metal castings. The apparatus is arranged and constructed to permit precise positioning of the metal cast tree while allowing the operator to manipulate the apparatus at a safe distance from the cutting blade.

Thus it will be seen that I have provided a novel apparatus for clamping and precisely cutting metal castings which is more efficient than any heretofore known comparable apparatus.

What is claimed is:

1. Apparatus for holding and cutting an metal cast tree comprising, a frame having longitudinal and transverse dimensions, a rotary driven cutting blade assembly including a cutting blade for rotation about a horizontal axis, means mounting said cutting blade assembly on the frame for vertical shifting movement of the cutting blade assembly relative to the frame, a horizontally disposed moveable clamp including clamping jaws for clamping and holding an investment casting cluster to be cut in a horizontal position, a pivot support pivotally connected to the clamp and supporting the clamp for horizontal pivoting movement in opposite directions about a vertical axis, means connecting said clamp to the pivot support for selectively rotating the clamp in opposite directions about a horizontal axis, a longitudinal slide assembly mounted on said frame and interconnected with the pivot support for shifting the clamp in a longitudinal direction relative to the frame towards and away from the cutting blade assembly, and a transverse slide assembly interconnected to the longitudinal slide assembly, and means connecting said transverse slide assembly with said pivot support for shifting the clamp and pivot support in a transverse direction relative to the frame and relative to the cutting blade assembly.

2. The apparatus as defined in claim 1 and means for locking the clamp in an adjusted angular position.

3. The apparatus as defined in claim 1 and means for locking the pivot support in an adjusted pivot position.

4. The apparatus as defined in claim 1 wherein said means connecting the pivot support with said transverse slide assembly comprises a carriage.

5. The apparatus as defined in claim 4 wherein the transverse slide assembly comprises a plurality of elongate slide rods extending transversely of the frame, and slide rod engaging members on said carriage for movement along the transverse slide rods.

6. The apparatus as defined in claim 4 and a handle secured to said carriage and projecting therefrom for manipulation by an operator when shifting the carriage in transverse and longitudinal directions relative to the frame and cutting blade assembly.

7. The apparatus as defined in claim 1 wherein said longitudinal slide assembly includes a plurality of elongate slide rods extending longitudinally of the frame, and slide rod engaging members connected to said transverse slide assembly and engaging the longitudinal slide rods for movement therealong.

8. The apparatus as defined in claim 1 wherein said means for mounting said cutting blade assembly on the frame includes a vertically disposed screw journaled on said frame, power means operatively connected to said screw for rotating the screw selectively in opposite directions, and means threadedly engaging the screw and connected with said cutting blade assembly for vertical movement in response to rotation of the screw.

9. The apparatus as defined in claim 1 wherein the means for rotating the clamp includes an elongate shaft, a hand wheel secured to said shaft for facilitating rotation of the shaft.

10. The apparatus as defined in claim 1 and a transparent shield secured to said pivot support for shielding an operator during the cutting of an metal cast tree.

11. The apparatus as defined in claim 1 and laser diode guide line device mounted on said cutter blade assembly for producing a cutting line guide light on the investment casting tree to enable an operator to make precise cuts.

* * * * *